United States Patent Office 3,814,622
Patented June 4, 1974

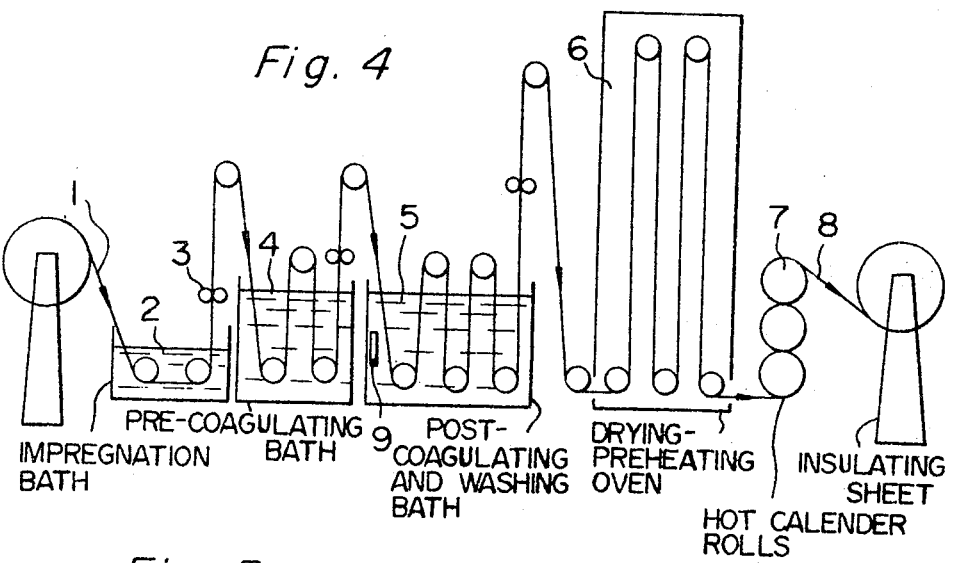
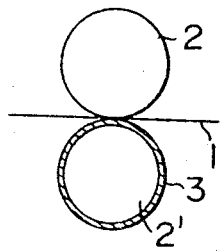
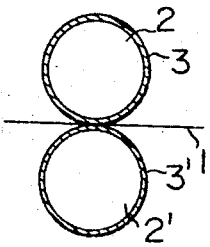
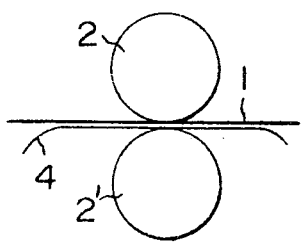
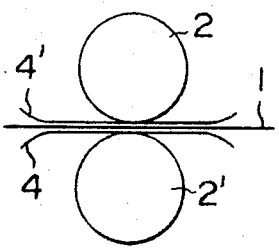

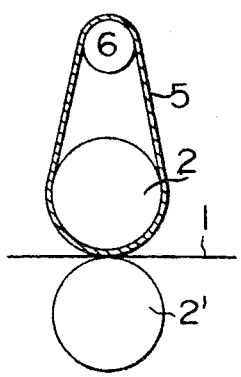
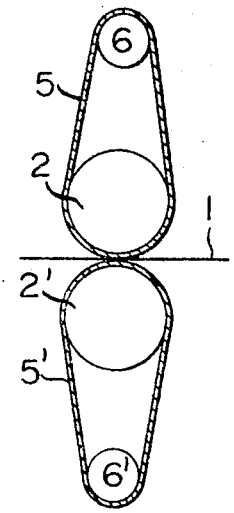
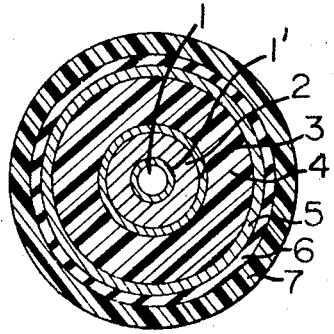
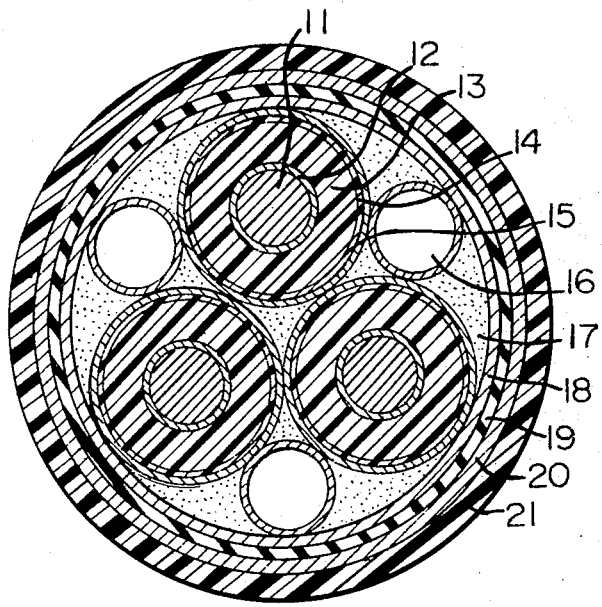

3,814,622
SYNTHETIC INSULATING PAPER FOR ELECTRIC INSULATION
Setsuya Isshiki, Funabashi, Shiro Nakayama, Yachiyo, and Kuniyuki Nakayama, Tokyo, Japan, assignors to The Fujikura Cable Works Limited, Tokyo, Japan
Filed Nov. 25, 1970, Ser. No. 92,804
Claims priority, application Japan, Nov. 29, 1969, 44/95,482; Dec. 30, 1969, 45/105,488; Feb. 6, 1970, 45/10,033; Apr. 20, 1970, 45/32,968; May 6, 1970, 45/37,928; June 10, 1970, 45/49,506; June 15, 1970, 45/51,052; Aug. 19, 1970, 45/72,069, 45/72,070
Int. Cl. H01b *3/02, 3/08, 3/20*
U.S. Cl. 117—126 AB                   1 Claim

ABSTRACT OF THE DISCLOSURE

A synthetic insulating paper for use in electrical insulation upon impregnation with an insulating fluid, said paper comprising a sheet consisting of a fibrous substrate and a matrix polymer uniformly distributed therein, said sheet being prepared by impregnating a porous, fibrous web or sheet material with a solution of a high-molecular-weight organic polymer at a rate such that the amount of said high-molecular-weight organic polymer is 5 to 70% by weight based on said web or sheet material, precipitating and coagulating said organic polymer three-dimensionally on said web or sheet and thereafter subjecting the treated web or sheet to calendering under pressure, said sheet having uniform fine voids with a void ratio in the range of 10 to 70%.

---

This invention relates to an electric insulating material having improved dielectric strength and dielectric loss, a process for its production, and to an OF cable equipped with said insulating material.

In recent years, demand for electric power has been steadily on the increase in the urban and industrial areas. To meet this demand, voltage used has been increasing, and transmission of voltages as high as 500 kv. or 750 kv. is being considered. Thus, cables for such high voltage transmission and electrical machinery and appliances annexed thereto must withstand such high voltages. The characteristics required of an insulating sheet incident to the increasing higher transmission voltage include high dielectric strength, high mechanical strength, stability over prolonged periods of time, and thermal stability. Electric cables further require low dielectric loss.

The conventional insulating sheets are insulating paper or plastic films. The main chemical component of the insulating paper is cellulose, and so the thermal stability of such paper is low. Heat deterioration considerably proceeds at temperatures above 120° C. Amine-containing papers or cyanoalkyl-containing papers have been proposed in an attempt to remove these defects, but have not proved satisfactory. Furthermore, the insulating paper has a high dielectric loss factor considerably higher than $3.1 \times 10^{-3}$ set as standard for designing 500 kv. OF cables. Accordingly, in the field of OF cables, insulating sheets of low dielectric loss factor have been strongly desired. On the other hand, insulating sheets of higher thermal stability are demanded in the field of electrical articles utilizing the insulating sheets, other than OF cables.

The purpose of using plastic films in the field of electric cables is to reduce the dielectric loss factor. To this end, plastic films such as polycarbonate polysulfone polyphenylene oxide (P.P.O.), polyethylene (PE), or polypropylene (PP) are fully satisfactory. However, when such films are used in OF cables, their oil resistance becomes a problem since they must be used in coexistence with an insulating oil in the cables. When used with a mineral insulating oil or a synthetic oil such as polybutene and alkyl benzenes, these plastic films undergo swelling, dissolution, crazing, cracking, etc., which constitute a setback against their practical applications. It is necessary therefore to discover new insulating oils.

An article containing a plastic film in a wound and laminated form with which an insulating oil is impregnated has a smooth surface, and therefore permits the permeation of oil only with difficulty, in which case voids tend to be formed, and meticulous care is needed for production of such article. In an attempt to remove these defects of the plastic films, there have been proposals for embossing the surface of a plastic film, or lapping an insulating paper and a plastic film alternatively. However, the first-mentioned proposal is unsatisfactory in respect of oil resistance, and the latter results in unsatisfactory dielectric loss factor.

Another great disadvantage of plastic films is the relation between the insulating thickness and the dielectric strength. Generally, this relation is that as the insulating thickness increases, the dielectric strength per unit thickness decreases. When the insulating thickness is small, the dielectric strength of a plastic film is far higher than that of an insulating paper. On the other hand, when the insulating thickness increases, the dielectric strength of the plastic film becomes far lower than that of the insulating paper. Namely, the dielectric strength of the plastic film tends to abruptly decrease with increasing thickness, whereas the decrease occurs slowly in the case of the insulating paper. Accordingly, an insulating material using a plastic film becomes thicker than that using insulating paper, and presents difficulties in respect of heat dissipating properties and low dielectric loss factor.

An object of the present invention is to provide a new electrically insulating material having a desirable combination of low dielectric loss factor and high dielectric strength and capable of being uniformly impregnated with an insulating fluid such as insulating oils, insulating gases or insulating varnishes, which insulating material is suitable for use in superhigh voltage cables and other electrical appliances.

According to the present invention, there is provided a synthetic insulating paper for use in electrical insulation upon impregnation with an insulating fluid, said paper comprising a sheet consisting of a fibrous substrate and a matrix polymer uniformly distributed therein, said sheet being prepared by impregnating a porous, fibrous web or sheet material with a solution of a high-molecular-weight organic polymer at a rate such that the amount of said high-molecular-weight organic polymer is 5 to 70% by weight based on said web or sheet material, precipitating and coagulating said organic polymer three-dimensionally on said web or sheet and thereafter subjecting the treated web or sheet to calendering under pressure, said sheet having uniform fine voids with a void ratio in the range of 10 to 70%.

The basic concept of the present invention is based on the finding that the synthetic insulating paper is superior in resistance to oil and capability of being impregnated with oil, and an insulating material composed of the fiber and fine oil droplets or membranes dispersed in the polymer matrix has high dielectric strength and a slow decreasing tendency in the relation between the insulating thickness and the dielectric strength.

The invention will be described in detail below.

FIBROUS WEB OR SHEET MATERIAL

The fibrous web or sheet material used in the invention as a fibrous substrate may be of any desired material. It may be of a woven cloth of filaments or fibers, a nonwoven cloth or a combination of these. Generally, from the viewpoint of uniformity of fibers in the synthetic insulating paper or the distribution of fine voids, non-woven cloths of filaments or staple fibers or the like materials are preferred. There is no particular restriction on the size of the filament or staple fibers. However, finer denier and smaller sectional area are preferred, because they permit easier formation of fine voids. Since larger denier results in a tendency of forming larger voids, the properties of synthetic insulating paper will be bettered if some restriction is set on the denier of filaments or staple fibers. Accordingly, 1.0 to 10 denier are preferred in the invention.

The non-woven cloth that can be used in the invention may be one poduced by coalescing fibers with one another by self-melt-adhesion or by using a bonding agent or a binder fiber to impart self-supporting properties and tensile strength. There can also be used a web or mat of staple fibers not bonded or melt-adhered to one another which does not substantially have self-supporting properties. The web or mat can be produced by a method known *per se*.

For example, when the length of the staple fibers is 10 to 50 mm., a web or mat of the staple fibers obtained by using a web-forming machine such as a carding machine or a garnet machine can be directly used. Or such web or mats are laminated, and needle-punched before use.

When the fiber length is 1.0 to 10 mm., the fibers are slurried by any known means, and subjected to a sheet-making machine to make a web or water leaf which is then used as the fibrous substrate in the present invention.

Where continuous filaments are used, electrostaticity is applied to the filaments, and the filaments are accumulated in a web form.

These non-woven cloths are known to those skilled in the art.

These webs or mats are used as the fibrous substrate directly or after having been integrated by self-melt-adhesion or bonding.

The filaments or staple fibers used in the production of the synthetic insulating paper in the present invention are not particularly restricted. For instance, they may be produced from natural fibers such as vegetable, animal and mineral fibers, regenerated cellulosic fibers, protein fibers, synthetic fibers such as fibers of cellulose esters, polyamides, polyvinyl alcohol, polyvinylidene chloride, polyvinyl chloride, polyacrylonitrile, polyesters, polyolefins, polycarbonate, polyphenylene oxide, polyfluoroethylene, and polysulfone, and also inorganic fibers such as fibers from glass, rock or slag. These fibers may be used alone or in combination of two or more kinds. The types and shapes of the fibers may be chosen according to the purpose of using the resulting insulating material.

It is self-evident that the fibers to be used should have a dielectric strength of a certain standard, for instance, more than 120 kv. when the thickness is 1 mm. When the increasing of thermal resistance is mainly intended without any particular need for $\epsilon$ tan $\delta$, natural or synthetic inorganic fibers, such as glass fibers, rock wool or asbestos must be selected, and as synthetic fibers, polycarbonate fibers, polyphenylene oxide fibers, polysulfone fibers, polyfluoroethylene fibers, polyacrylonitrile fibers, polyester fibers, and aromatic polyamide fibers. When it is desired to reduce the dielectric loss factor, for example in the case of using the insulating material in OF cables, the material itself should have a low dielectric loss although it is closely dependent on the organic high-molecular weight polymer used as the matrix polymer. Thus, polyolefin fibers, polyfluoroethylene fibers, polyester fibers, polyphenylene oxide fibers, polysulfone fibers, aromatic polyamide fibers and glass fibers are selected. Synthetic insulating papers of various unique properties can be produced by combining such proper fibers with proper high-molecular-weight organic polymers.

When the electrical properties of the sheet are concerned, the void ratio (percent) of the sheet is preferably in the range of 10 to 70% in a state where the sheet has been collapsed under a pressure of 500 g./cm.² When the void ratio is less than 30%, the void ratio of the resulting synthetic insulating paper becomes smaller, although it depends somewhat on the coating conditions for application of a solution of the high-molecular-weight organic polymer. Consequently, like a film, its mechanical strength such as tensile strength increases, while there is less improvement of the thickness characteristics of the dielectric strength. The void ratio could be reduced up to 10% at some sacrifice of electrical properties. Void ratios in excess of 70% result in a failure to form fine voids and to increase the dielectric strength.

In the present specification and claims, the void ratio (percent) is a value obtained in accordance with the following equation $$x \text{ (percent)} = \frac{V_2 - V_1}{V_2} \times 100$$

wherein $V_2$ is a bulk volume of the sheet which is the product of the thickness ($t$) of the sheet and the area ($s$) of the sheet, and $V_1$ is a net volume of the sheet to be measured, for instance, by an air comparison-type specific gravity meter (930, product of Toshiba Beckman Kabushiki Kaisha, Japan).

The fibrous web or mat preferably has an apparent density of 0.2 to 1.0 g./cm.³, although it varies according to the fiber length.

HIGH-MOLECULAR-WEIGHT ORGANIC POLYMER

In the synthetic insulating paper of the present invention, the high-molecular weight organic polymer is uniformly distributed in the fibrous web substrate described, and fine voids of uniform size desirable, for the impregnation of an insulating fluid are also uniformly distributed. The high-molecular-weight organic polymer distributed in the fibrous web substrate will be referred to in the present specification or claims as the matrix polymer or resin.

Such a matrix resin may be any polymer which is soluble in a solvent and has a film-forming ability. Specific examples of the matrix resin include polyolefinic plastics, natural and synthetic rubbers, polystyrene, polyvinyl acetate, polyalkyl methacrylate, polyphenylene oxide, and copolymers consisting predominantly of styrene, which are soluble in aromatic solvents; cellulose ester polymers soluble in acetone and the like solvent; polyesters, polyamides, polyurethane, polycarbonate, polysulfone, polyacrylonitrile and copolymers of these, which are soluble in N,N'-dimethylformamide, or N,N'-dimethylacetoamide; vinyl polymers soluble in cyclohexane; and polyalkylacrylates soluble in methanol and the like polymers.

As a matter of course, the matrix resin used should have dielectric constant required of an insulating material and low dielectric loss, and should not be soluble in the insulating oil used. Those skilled in the art can choose the type of the matrix resin according to the type of the insulating oil used.

The matrix resins particularly suited for the objects of the present invention include, for example polycarbonate resins, polyphenylene oxide resins, polysulfone resins, polyester resins, polyamide resins, and polyolefin resins (polyethylene or polystyrene, etc.).

In the synthetic insulating paper of the present invention, it is desirable that 5–70% by weight, preferably 10–30% by weight, of the matrix resin be incorporated based on the fibrous web or sheet material.

For the formation of uniform and fine voids in the synthetic insulating paper, it is especially important that the matrix resin described is impregnated in the form of solution into a fibrous web or sheet material, the resin is precipitated onto said web or sheet material from the solution, and the treated material is subjected to calendering. Mere coating of the polymer on the fibrous substrate or coating a polymer containing a blowing agent and then foaming it does not lead to the formation of an electrically insulating paper having a desirable combination of low dielectric loss and high dielectric strength upon impregnation of an insulating fluid and also having a void ratio of 10 to 70%, as intended by the present invention.

The matrix resins may be used singly or in combination of two or more.

Other materials may be added to the synthetic insulating paper in order to give special properties thereto. For example, a synthetic insulating paper prepared by using a matrix resin containing finely divided powder of mica has a higher dielectric strength because the thin mica flakes are uniformly distributed over the surface of the synthetic insulating paper. A synthetic insulating paper prepared by using a matrix resin containing a strongly dielectric substance of barium titanate possesses high dielectric constant.

PRODUCTION OF SYNTHETIC INSULATING PAPER

A. Coating of solution of resin

According to the method of this invention, a solution of the polymer described is impregnated into the fibrous substrate. There is no particular restriction on the method of impregnating or coating this solution, and such known means as immersion coating, roll coating, spray coating, or doctor blade coating may be used. When the web or mat itself is poor in self-supporting characteristics, it is carried on a suitable carrying device and passed through a tank containing a coating solution, followed by squeezing to a certain predetermined amount of the resin. The coating can also be effected by spraying a coating solution onto a web or mat on the carrying device, or passing the web or mat through coating rolls.

The solvent used in this instance may be one which dissolves the matrix resin but not the fibers. The solubility of the matrix resin in the solvent should be at least 5% preferably at least 10%. The type of the solvent to be used is selected according to the type of the matrix resin. Hence, the solvent is selected depending upon the high-molecular-weight organic polymer which it dissolves.

Examples of the solvent that is used conveniently in the invention include aromatic hydrocarbon solvents such as benzene, xylene and toluene, ketones such as acetone, methyl ethyl ketone and cyclohexanone, and amides such as N,N'-dimethyl formamide and N,N'-dimethyl acetamide. Besides these, carbon tetrachloride, chloroform, dichloroethane, trichloroethane, N-methyl pyrrolidone, formic acid, sulfuric acid, phenols, and esters are used with good results. These solvents may be used singly or in admixture.

In the present invention, ultrasonic vibration may be applied at the time of immersing the fibrous substrate in the solution of the high-molecular-weight organic polymer. When a fibrous substrate is simply immersed in a solution of the polymer, the solution cannot be impregnated completely into the dense or intertwined parts of the fibers, and bubbles, which are difficult to remove completely, tend to remain. Bubbles remaining in a dense portion of the fibers still remain in the subsequent coagulation and precipitation step and the calender rolling step. For example, in the case of a synthetic insulating paper having a thickness of 100μ, these bubbles may have a size of as large as 30μ in the direction of thickness, and sometimes they are linked to one another and extend through the fibers in the direction of thickness.

In synthetic insulating papers of oil-impregnated type, the dielectric strength depends upon the air-permeability of the insulating paper, particularly the fineness and uniformity of the voids. When large bubbles remain, the dielectric strength of the insulating paper decreases. As a matter of fact, a synthetic insulating paper having such coarse bubbles not only has low dielectric strength on an average, but also some part of the paper has extremely had dielectric strength as compared with the other. It is difficult to remove the aforementioned bubbles, and this tendency becomes larger with an increasing speed of production of the synthetic insulating paper.

According to the present invention, however, bubbles remaining in the dense or intertwined parts of the fibers can also be removed effectively by immersing the fibrous substrate in a solution of the high-molecular-weight organic polymer under the irradiation of ultrasonic vibration.

The coating of the matrix resin can be effected easily in accordance with the present invention by continuously supplying a fibrous substrate, if necessary together with some suitable carrying material, into a tank equipped with an ultrasonic vibration generator and containing a solution of the high-molecular-weight organic polymer, and immerse it in the solution.

The maximum vibration can be given to the fibrous substrate impregnated with the polymer solution by making the distance ($\lambda$ cm.) between the fibrous substrate and the ultrasonic generating surface approximate to the value of the following equation $$\lambda = \frac{V}{4\lambda}$$

wherein V is a sonic velocity (cm./sec.) in the polymer solution, and $\lambda$ is the number of vibration (Hz./sec.) of the ultrasonic vibration, namely, the distance corresponding to ¼ of the wavelength. The value V is about 1,500 m./sec. in a polymer solution having a density of 1.

The frequency of the ultrasonic vibration used need be 16 kHz. or above so as to remove the bubbles completely. When the frequency is above 50 kHz., the value becomes too small. Furthermore, it is necessary that the output of the ultrasonic vibration be at least 0.5 watt./cm.$^2$. Defoaming action is reduced considerably at the output less than this.

B. Coagulation of matrix resin

The matrix resin impregnated into the fibrous substrate in the form of solution is then precipitated onto the substrate by any desired means.

According to one embodiment of the present invention, a fibrous web or mat impregnated with a solution of the high-molecular-weight organic polymer is immersed in a liquid medium which is miscible with said organic solvent but is a non-solvent for the polymer to precipitate the polymer on the fibrous web or mat. Where the solvent in a coagulating tank for extracting and dissolving the solvent in the polymer solution has too small a solubility for the solvent in the polymer solution, the coagulation of the precipitated polymer becomes incomplete, and the polymer solution is likely to come off from the fibrous sheet before coagulation. Accordingly, the solvent in the coagulating tank should be a good solvent for the solvent in the polymer solution. For this reason, the solvent-immersing method tends to give relatively large and coarse voids of the precipitated high-molecular-weight organic polymer. However, it is possible to form relatively small voids by properly selecting a combination of the matrix resin, an organic solvent for the matrix resin and a liquid coagulation medium, and thus permitting slow precipitation of the polymer. In any case, the fibrous web or mat so treated is subjected to calendering. By this treatment, the characteristics based on the voids are restricted depending upon the calendering conditions, for example by the collapsing of the voids.

Coagulation by temperature change or application of a solvent vapor is insufficient, and such should rather be called pre-coagulation. In this instance, therefore, complete coagulation should be done by using a coagulating solvent. The speed of the coagulation depends mainly upon the speed of extraction of the solvent from the solution of the polymer or solvent substitution, and therefore it is necessary that the coagulating solvent should be a good solvent for the solvent of the polymer solution. Auxiliary means such as stirring or ultraviolet vibration are effective for promoting the coagulating process.

The coagulating solvent is selected depending upon the solvent of the polymer solution. The coagulating solvent most desirable for economical reasons is water. Where water is used as the coagulating solvent, the solvent for the polymer solution may be ketones such as acetone, amides such as N,N'-dimethyl formamide, and N,N'-dimethyl acetamide, alcohols such as methanol, N-methylpyrrolidone, cyclohexanone, formic acid, sulfuric acid, and phenols. When the solvent of the polymer solution is an aromatic solvent, chloroform, carbon tetrachloride, dichloroethane, trichloroethane, phenol, or ester, water cannot be used as the coagulating solvent; in this case, methyl alcohol or ethyl alcohol is used as the coagulating solvent. Other solvents may also be used as the coagulating solvent, but here water and alcohols are illustrated as coagulating solvents which can be selected for a wide range of solvents for the polymer solution.

In another embodiment of the present invention, a fibrous substrate impregnated with the polymer solution is cooled to a temperature below the freezing point of said solution to precipitate the polymer in a three-dimensional network structure. In this freezing coagulation step, the solvent freezes alone, and only the organic polymer is separated and precipitated. Therefore, the polymer precipitated in this instance takes the form of a matrix of three-dimensional network structure integrated around the frozen solvent crystals. When the solvent crystals are melted and removed by any means such as compressing, evaporation or extraction, fine voids are uniformly distributed inside, and a resin matrix of a three-dimensional network structure is formed within the fibrous substrate.

Rapid freezing is preferred to make the voids in the polymer matrix fine. Slow freezing results in larger voids. For cooling the fibrous substrate impregnated with the polymer solution rapidly to below the freezing point, a liquid cooling medium is used, and the fibrous substrate impregnated with the polymer solution is immersed in this liquid cooling medium. By this, the rate of heat exchange between the cooling medium and the fibrous substrate is increased, and rapid freezing becomes possible. As the freezing medium, alcohols can be used for cooling to temperatures to about $-60°$ C. Liquefied gases such as liquid nitrogen and liquefied air are used as the freezing medium at extremely low temperatures. Other cooling media may also be used so long as they do not adversely affect the characteristics of the synthetic insulating paper.

Solvent extraction after precipitation of the polymer matrix may be effected by any means known per se such as compressing, extraction and washing, and evaporation.

In the case of the former method in which the solvent of the polymer solution is replaced by a non-solvent (solvent replacing method), the polymer is precipitated in relatively large particles, relatively large voids tend to remain through the matrix resin. The voids are considerably collapsed to smaller voids by calendering, and the entire voids are made uniform.

However, when the impregnated polymer solution is frozen in accordance with the latter-mentioned embodiment, fine voids are formed uniformly in the matrix of the precipitated polymer. Subsequent calendering of such product makes it possible to allow the voids to retain an insulating fluid more finely than the synthetic insulating paper obtained by the solvent replacing method, and to increased the dielectric strength more.

The polymer matrix precipitated by the freezing method is in a crystallized state instead of a gelled state as compared with the solvent replacing method, and therefore is superior in mechanical strength in conjunction with its integrated three-dimensional network structure.

C. Calender rolling

According to the process of the present invention, the porous sheet so obtained is subjected to calender rolling under pressure while heating to form a sheet having a void ratio in the range of 10 to 70%.

The temperature for calendering may be at least $10°$ C. lower than the melting point of the coagulated polymer, preferably $10-50°$ C. lower than the melting point. When the heating temperature is near the melting point of the polymer, the coagulated polymer becomes fluidified and melt adheres in a film form, resulting in the disappearance of voids of the synthetic insulating paper. If, on the other hand, the temperature is too low, fluidifying and melt-adhesion hardly occur, and the voids are not collapsed to fine sizes, and the mechanical strength of the synthetic insulating paper does not increase. The calendering pressure is 10–300 kg./cm., preferably 10–50 kg./cm. at the point where the calender roll comes into contact. Excessively low pressures do not give rise to an increase in the dielectric strength, because the fluidifying and melt-adhesion of the coagulated polymer hardly occur. On the other hand, when the pressure is too high, the fluidifying and melt-adhesion become excessive, and the polymer takes a form near film.

Thus, a synthetic insulating paper containing a number of fine voids is obtained.

The calender rolling in the present invention may be effected in a wet condition, and by so doing, it is possible to maintain the corona discharge initiating voltage of the electrically insulating synthetic paper at a high level.

When the sheet to be treated is first dried and then subjected to calendering, some closed cells would be formed in the matrix polymer precipitated on the fibrous substrate if the compressing force between the calender rolls becomes too high such as 300 kg./cm. Such voids remain as closed cells even when the synthetic insulating paper is impregnated with an insulating oil, and the insulating oil does not permeate but remains as cells. This becomes a cause of an extraordinarily low corona initiation voltage. On the other hand, when the sheet is subjected to calendering in a wet condition, the voids in the matrix polymer is present as open cells without becoming closed cells. Consequently, when an insulating oil is impregnated into the product, all of the voids are filled with the insulting oil, and the occurrence of very low corona discharge initiation voltage is prevented. Since the number of such closed cells is very small even in the synthetic insulating paper which exhibits very low corona initiation voltage, it is very difficult to ascertain their presence by the naked eye. However, the above assumption can be made because when the pressure of the insulating oil is elevated at the time of impregnation, the corona discharge initiation voltage of an ordinary specimen increases, but in an abnormal specimen, the elevated pressures hardly change its corona discharge initiation voltage.

In this embodiment, a porous sheet is compressed by the calender rolls in a state wetted with a coagulating solvent or washing liquid without subjecting it to a drying step. Such a calendering treatment results in the collapsing of voids present in the polymer to form a synthetic insulating paper having a number of fine continuous voids. To attain the wet condition, it is preferable to incorporate the above-mentioned liquid in an amount at least 30% by weight.

D. Modification of the manufacturing process

To have a better understanding of the present invention, reference may be made to the accompanying drawings, in which:

FIG. 4 is a schematic view for illustrating another embodiment of the process of the present invention;

FIGS. 5 to 10 are views for illustrating the arrangement of the fibrous sheet containing a coagulated matrix resin, rolls and an elastic body in the calendering step of the process of the present invention;

FIG. 11 is a sectional view of a single core OF electric cable using an electrically insulating synthetic paper; and FIG. 12 is a sectional view of a three-core OF electric cable using the electrically insulating synthetic paper according to the present invention.

Figure 1:
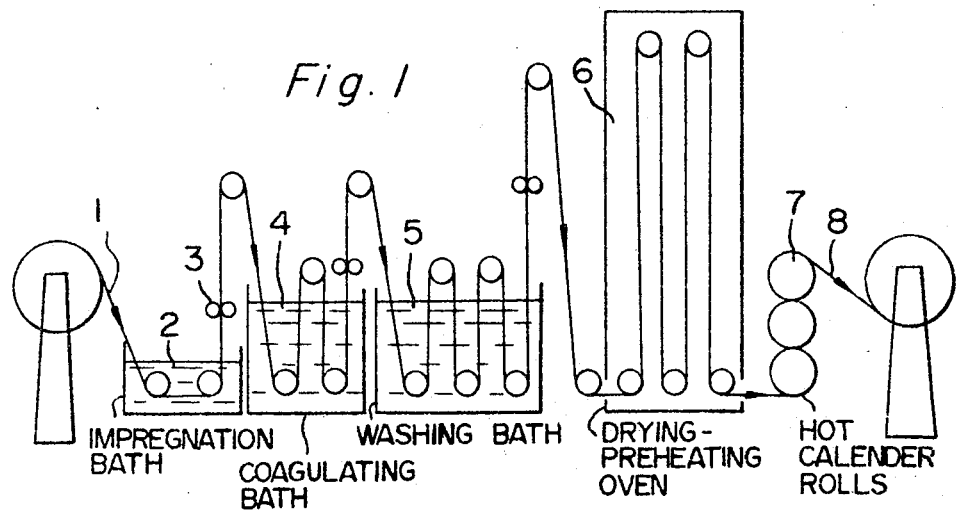
FIG. 1 is a schematic view for illustrating one embodiment of the process steps of the present invention.

Referring to FIG. 1, a starting self-supporting non-woven cloth 1 is unwound from a feed reel, conducted to a solution of a high-molecular-weight organic polymer contained in an impregnating bath, and impregnated with the polymer solution. The non-woven cloth impregnated with a solution of the polymer is passed through a pair of squeezing rolls 3 to adjust the polymer content to a predetermined value, and conducted to a coagulating medium 4 contained in the coagulating bath. Thus, the polymer is coagulated in the polymer. The non-woven cloth on which the polymer is coagulated is then conducted to a washing liquid 5 contained in a washing tank, where the solvent is almost completely removed. The non-woven cloth is then dried in a drying preheating oven 6, and compressed to a predetermined void ratio by means of hot calender rolls 7. Thereafter, it is wound up on a reel as an electrically insulating paper 8. In this instance, the non-woven cloth needs some tensile strength as is seen from the process of production mentioned above. Although varying depending upon the material and the manufacturing conditions, a tensile strength of about 500 g. for a sheet of 5 cm. width is required. Such tensile strength may be achieved by self-melt-adhesion of the fibers or by using an adhesive.

In the aforementioned step, the purpose of washing consists in the removal of the solvent of the coating solution. Hence, it is preferred that the washing liquid is the same as the coagulating solvent. However, when a coagulating solvent such as alcohols or other solvents than water is used, the use of such coagulating solvent as a washing liquid is not economically advantageous. When aromatic solvents, chloroform, carbon tetrachloride, dichloroethane, and trichloroethane which are relatively low boiling solvents, are used, the solvent of the polymer solution can be removed by evaporation and drying by going straight from the coagulating step to the drying step without the washing step. In the case of relatively high boiling solvents such as phenols and esters, it is possible to wash and extract the treated fibrous sheet with a solution of a surfactant by ultrasonic vibration, and then wash it with water to remove the solvent and the surfactant.

The drying preheating step is for the purpose of drying for removal of the washing liquid and the hot calendering finishing step. No particular drying preheating apparatus is needed. The temperature of the fibrous sheet at the time of leaving the drying preheating oven is preferably near the temperature of the calender rolls.

In another embodiment of the invention, there is provided a process for producing an electrically insulating synthetic paper, which comprises impregnating a web or mat of staple fibers not bonded or melt-adhered to one another with a solution of a high-molecular-weight organic polymer in an organic solvent at a rate such that the amount of the polymer is 5 to 70% by weight based on the web or mat, immersing the web or mat in a liquid medium which is miscible with said organic solvent but is a non-solvent for the polymer to precipitate said polymer on the staple fibers, and subjecting the resulting sheet to calendering under pressure while heating, thereby to form a sheet having a void ratio in the range of 10 to 70%.

In this embodiment, a web or mat of staple fibers not bonded or melt-adhered to one another is used as the fibrous substrate of the synthetic insulating paper, or a web or mat of staple fibers having substantially no self-supporting properties is used. The term "self-supporting properties" used in the present specification and claims means that the fiber itself has a tensile strength of a degree such as can withstand external force, and can retain its own shape. Since a self-supporting non-woven cloth has a relatively high apparent density, where it is impregnated with a solution of the matrix resin, there is a tendency that the matrix resin deviates to a layer near the surface of the cloth, and moreover, the distribution of the matrix resin is often not uniform. A non-woven cloth rendered self-supporting by application of an adhesive tends to be adversely affected by the heat-treatment to be carried out during or after the application of the adhesive. In this embodiment of the present invention, the web or mat of staple fibers not substantially bonded or melt-adhered to one another is particularly used from such a viewpoint. The web or mat used in this process is generally poor in self-supporting properties. The application of a solution of the matrix resin is therefore performed by carrying it on a suitable carrying device, passing it in this state through a bath containing the matrix resin solution, and thereafter subjecting it to squeezing rolls. The application of the matrix resin solution can also be effected by spraying the coating solution onto the web or mat placed on the carrying device or passing the web or mat through coating rolls.

The foregoing embodiment will be described in detail with reference to FIGS. 2 and 3 later on.

In still another embodiment of the present invention, there is provided a process for producing a synthetic paper which comprises immersing a fibrous substrate impregnated with a solution of a high-molecular-weight organic polymer in a coagulating liquid medium which is miscible with the solvent of the said polymer solution but is a non-solvent for the polymer and subjecting the resulting sheet to calendering under pressure while heating, characterized in that the coagulation of the organic polymer is effected at least at the interface between the coagulating liquid medium and the polymer solution and then the coagulation is completed by subjecting the sheet-like material to ultrasonic vibration in the presence of the coagulating liquid medium.

The critical feature of this embodiment is that the coagulation of the organic polymer is effected at least at the interface between the coagulating liquid medium and the polymer solution, and then the coagulation is completed by subjecting the sheet-like material obtained to ultrasonic vibration in the presence of the coagulating liquid medium.

When a fibrous substrate impregnated with a solution of a polymer is immersed in a coagulating medium, the coagulation of the polymer first occurs at the interface of the polymer solution and the coagulating medium due to the affinity of the coagulating medium with the solvent of the solution. The replacement of the solvent by the coagulating medium proceeds thereafter through a film of the coagulated polymer, and the speed of the replacement becomes slower with the progress of the replacement.

In this embodiment of the present invention, ultrasonic wave is irradiated to the cellular polymer in the state contained in the film of the polymer and the network structure of the fibers, whereby the cellular, uncoagulated polymer solution filled in the sheet material is divided finely, and dispersed uniformly in the sheet material to form a synthetic paper having uniform and fine voids. By applying such ultrasonic vibration, the replacement of the solvent by the coagulating medium is also considerably promoted.

Ultrasonic vibration having a frequency of the type conventionally used in the emulsification of an oily matter can generally be used, the preferred frequency being 20 to 300 kc., for instance.

The irradiation of ultrasonic vibration may be effected at a time when a film of the polymer is formed at the interface between the polymer solution and the coagulating medium and on the other hand, the polymer solution still remains in the sheet material. The time of such irradiation may vary depending upon the types of the polymer, the solvent and the coagulating medium, the temperature, and so on. Generally, however, it is preferred that ultrasonic vibration be irradiated after pre-coagulating the fibrous substrate impregnated with the polymer solution or a filmy material of a mixture of staple fibers and the polymer solution by immersing it in a coagulating medium for 0.5 to 3 minutes.

The precoagulation and the coagulation under the irradiation of ultrasonic vibration can be effected in a single coagulating bath. But for complete removal of the solvent of the polymer solution, it is preferable to carry out the precoagulation and the coagulation under ultrasonic vibration in a plurality of coagulating baths.

Referring to FIG. 4, a self-supporting non-woven cloth is unwound from a feed reel, and conducted into a solution of a high-molecular-weight organic polymer contained in an impregnating bath where it is impregnated with the polymer solution. The non-woven cloth impregnated with the polymer solution is passed through a pair of squeezing rollers 3 to adjust the polymer content to a predetermined value, and then introduced into a coagulating solution 4 contained in the coagulating bath, where the precoagulation of the polymer is performed. The non-woven cloth containing the pre-coagulated polymer is then introduced into a coagulating washing solution 5 contained in a post-coagulation bath. The post-coagulating bath contains an ultrasonic vibration generator 9 therein, and complete coagulation of the polymer and the removal of the solvent of the polymer solution are effected under the irradiation of ultrasonic vibration. The non-woven cloth containing the coagulated polymer is then dried in a drying preheating oven 6, and compressed by hot calender rolls 7 to a predetermined void ratio, following which it is wound up on a reel as an electrically insulating synthetic paper 8.

According to still another embodiment of the invention, there is provided a process for producing a synthetic insulating paper which comprises impregnating a porous fibrous substrate with a solution of a high-molecular-weight crystalline organic polymer, precipitating said matrix polymer on the fibrous substrate in a three-dimensional form, and then subjecting the porous sheet obtaned to calendering under pressure while heating, characterized in that said sheet is heat-treated at a temperature of at least 80° C. and above the glass transition temperature ($T_g$) of the matrix polymer but below the melting point ($T_m$) of the matrix polymer for a time sufficient to substantially crystallize said polymer, before or after the calendering step.

The critical feature of this embodiment is that before or after the calendering step, the porous sheet or synthetic insulating paper is heat-treated at a temperature of at least 80° C. and above the glass transition temperature ($T_g$) of the matrix polymer but below its melting point ($T_m$) for a time sufficient to substantially crystallize the matrix polymer.

The matrix resin in a synthetic insulating paper produced by the solvent replacing method or freezing method has a low degree of crystallinity and is almost amorphous since the precipitation of the matrix polymer is very rapid and it does not undergo sufficient heat-treatment as to effect crystallization. Hence, the synthetic insulating paper obtained has small elasticity and excessive elongation, and it has large tan δ.

In the production of cables or condensers using the insulating paper in a wound and laminated state, larger elasticity and smaller elongation are preferred. Moreover, cables and condensers require insulating paper of low dielectric loss. From this point of view, proper crystallization of the matrix resin in the synthetic insulating paper almost completely meets the demand of characteristics required of high voltage transmission.

The general effect of crystallization of the matrix resin in the synthetic insulating paper shows itself in an increased elasticity of the synthetic insulating paper.

Where the matrix resin is a high-molecular-weight organic polymer such as polyamides, polyesters, polyimides, polyethers, polycarbonate and polysulfones, the permanent dipole within the molecule of the resin is restrained by crystallization, and consequently, the dielectric characteristics are improved, or the tan δ value if reduced.

The crystallization of a high-molecular weight organic polymer can be understood as a process in which a crystalline phase having a certain degree of crystallinity generally of spherical crystals growth with the passage of time of the volume ratio α of a crystal phase having a certain degree of crystallinity are mathematically expressed by the following equation of Avrami.

$$\alpha = \exp(-Rt^n)$$

wherein

R is a crystallization speed constant,
$t$ is time, and
$n$ is a constant determined by the manner of crystallization.

It is seen from the equation of Avrami that when the matrix resin is determined, the growth of a crystalline phase varies considerably depending upon the crystallization speed constant R. The crystallization speed constant R is a value dependent upon temperature, and becomes larger with increasing temperatures. In other words, heating is a general treatment for crystallizing a polymer, and at higher temperatures, the object is achieved within shorter periods of time. Hence, the heat-treatment for crystallizing the matrix resin in the synthetic insulating paper may be effected a desired number of times if the practicability is ignored.

Proper heat-treating conditions should be determined from the viewpoint of commercial feasibility. Changes in properties of a synthetic insulating paper by crystallization were determined by varying temperatures using various matrix resins. It has been found that the practical heat-treating temperature is at least 80° C., and above the glass transition temperature ($T_g$) of the matrix resin but below its melting point ($T_m$).

The melting temperature ($T_m$) and the glass transition temperature ($T_g$) of the resin used vary considerably depending upon the types of the resin. For example, the glass transition temperature of polycarbonate resin is 120–150° C., and its melting point reported in the literature is 220–230° C. But the coagulated polycarbonate is amorphous, and has a melting point of 180–195° C.

Polyamides and polyesters have a glass transition temperature of not more than 100° C., and therefore, the feasible heat-treating temperatures for these resins are considerably higher than this, and preferably at least 110° C. Polyolefins such as polyethylene and polypropylene have a glass transition temperature below 0° C., but the practical heat-treating temperatures are about 80° C. Thus, the practical heat-treating temperature of the matrix resins are sometimes considerably higher than the glass transition temperature of the resins, but as a whole are included within the range above the glass transition temperature but below the melting point.

The crystallizing step of the matrix resin by heat-treatment may be before or after the calendering step if it is after the washing step. However, it is not desirable to place a heat-treating step in a continuous process for the preparation of a synthetic insulating paper, since the heat-treating step takes several days to 10 and odd days. Accordingly, the crystallization of the synthetic insulating paper by heat-treatment is carried out after the calendering step. Since the crystallized matrix polymer has a high flow point and high elasticity, calendering after the heat-treatment is disadvantageous.

Thus, in this embodiment of the present invention, the sheet obtained is heat-treated to a specific temperature before or after the calendering, whereby the resulting synthetic insulating paper has high elasticity, a reduced elongation, and improved dielectric characteristics such as tan $\delta$.

According to still another embodiment of the present invention, there is provided a process for producing a synthetic insulating paper which comprises impregnating a porous fibrous substrate with a solution of a high-molecular-weight organic polymer, precipitating said polymer in a three-dimensional form on the fibrous substrate, and then subjecting the resulting porous sheet to calendering under pressure while heating, characterized in that said porous sheet is subjected to calendering while placing an elastic body having elasticity of $1 \times 10^2$ to $2 \times 10^5$ kg./cm.$^2$ on at least one side of the porous sheet.

The critical feature of this embodiment is that a porous sheet consisting of a fibrous substrate containing the coagulated matrix resin is subjected to calendering while placing an elastic body having an elasticity of $1 \times 10^2$ to $2 \times 10^5$ kg./cm.$^2$ on at least one surface of the sheet.

The fibers which constitute the synthetic insulating paper have high elasticity and compressive strength since the natural fibers are highly crystallized and the synthetic fibers are highly oriented. The matrix resins, however, are far lower in apparent elasticity and compressive strength than the fibers because the matrix resins are porous and almost amorphous. Thus, like ordinary foams, their elastic limit is far larger than the fibers.

When such a synthetic insulating paper is subjected to calendering by rigid rolls having a smooth surface, such as steel rolls whose surfaces are plated with chromium, most of the compressive force is borne by the fibers, and the matrix resin is only elastically deformed without being collapsed by the rolls. Hence, a compact microstructure does not result, and the air-permeability of the synthetic paper is not improved. The air-permeability of the paper is improved to some extent if calender rolls having a larger compressive force between rolls are used as to deform the matrix resin too, but the treated synthetic insulating paper has a high density and a reduced void ratio. The paper becomes an insulating material similar to a film, and has undesirable thickness characteristics of the dielectric strength.

However, when the porous sheet is calendered via an elastic body, uniform compressive force can be given to every part of the matrix resin in the porous sheet material. At the time of compression, that part of the porous sheet material in which the intertwined fibers are dense intrudes into the elastic body, and into that part of the sheet in which the fibers are less intertwined, the elastic body intrudes. It is thus possible to press the matrix resin effectively. In this manner a synthetic insulating paper improved dielectric strength, namely of improved air-permeability can be produced by compressing the matrix resin in the porous sheet uniformly without excessively compressing the dense portion of the fibrous substrate of the porous sheet and that part of the fibers where the intertwining of the fibers is dense.

The elastic body used differs depending upon the types of the fibers and the matrix resin that constitute the synthetic insulating paper. Generally speaking, the elastictiy of an elastic body should be smaller than that of the fibers and larger than that of the matrix resin. If the compression of the porous sheet were effected via an elastic body having an elasticity larger than the elasticity of the fibers, the fiber portion of the sheet would not be able to intrude into the elastic body, and therefore, it would be impossible for the elastic body to collapse the matrix resin portion. Consequently, the result is the same as in the case of treating the sheet with rigid rolls having a smooth surface.

If, on the other hand, the compression of the porous sheet were performed by using an elastic body having an elasticity smaller than that of the matrix resin, only the elastic body would be deformed, and the compression of the synthetic insulating paper would fail. Thus, an increase in the air-permeability cannot be expected.

The elasticity of the fibers and the matrix resin differs according to their types. For the same type, the elasticity differs according to the crystallinity and the degree of orientation (elongation) or temperatures. From a viewpoint of practicability, changes in elasticity according to temperatures are important. Generally, increased temperatures bring about a decrease in elasticity. Hence, when the calendering of the porous sheet is carried out at high temperatures, the air-permeability of the sheet can be improved by using an elastic body of relatively small elasticity and with small compressive force.

The elasticity of the elastic body is effective over a very wide range owing to various factors, and varies depending upon the material of the synthetic insulating paper and the calendering conditions. It is therefore difficult to define it. According to our experience, elastic bodies having an elasticity in the range of $1 \times 10^2$ kg./cm.$^2$ to $2 \times 10^5$ kg./cm.$^2$ can be used. The elastic body may be a unitary body, or may be made of a plurality of component parts.

As the material of the elastic body, natural rubber, various synthetic rubbers such as chloroprene, NBR, SBR, EPR, EPTR, and silicone rubber, and plastics such as polyethylene, polypropylene, polyamides, and fluorine-containing polymers can be used. Fibrous elastic bodies prepared by compressing with high pressure cellulose fibers such as cotton and pulp and wool asbestos fibers either alone or in admixture, and epoxy resin impregnated paper having an elasticity of about $1 \times 10^5$ kg./cm.$^2$ can also be used.

Various procedures can be employed in calendering using an elastic body. Several examples of the calendering are illustrated in FIGS. 5 to 10.

FIGS. 5 and 6 are sectional views showing rolls 2 and 2' on the surfaces of which elastic bodies 3 and 3' are mounted. In FIG. 5, the elastic body 3 is mounted on one of the rolls for treating synthetic insulating paper 1. In FIG. 6, the elastic bodies are mounted on both rolls 2 and 2'. FIGS. 7 and 8 indicate the process in which sheet-like elastic bodies 4 and 4' are placed along the synthetic insulating paper at the time of calendering. In FIG. 7, the sheet-like elastic body is placed only on one roll and in FIG. 8, it is placed alone both of the rolls.

FIGS. 9 and 10 show the process in which the synthetic insulating paper 1 is subjected to calendering while belt-like elastic bodies 5 and 5' are disposed between compression rolls 2 and 2' and and support rolls 6 and 6'. In FIG. 9, the elastic body is placed along one surface only of the synthetic insulating paper, and in FIG. 10, it is placed along both surfaces of the synthetic insulating paper. There may be other specific embodiments of the elastic body. The essential point here is that compressing the porous sheet via the elastic body can lead to the production of a synthetic insulating paper having sufficient air-permeability, namely sufficient dielectric strength.

The synthetic insulating paper of the invention can also be produced by the modified process, in which a solution of two or more high-molecular-weight organic polymers is used and coagulated in the manner mentioned above, and thereafter, the porous sheet is immersed in a solvent which dissolves only a specific polymer in the solution to removing such specific polymer. This removal may be carried out after hot calendering treatment. This method will be specifically described below.

Polystyrene is soluble in the aforementioned solvents and also well soluble in N,N'-dimethylacetamide which dissolves polyamides. For example, polyamide and polystyrene are dissolved in N,N'dimethylacetamide to form a 15% solution (5% polystyrene and 10% polyamide). This coating solution was applied to a polyester non-woven cloth, and coagulated from water. By a customary method, the treated non-woven sheet is washed, dried and hot calendered, and immersed in benzene to remove polystyrene only. According to this process, a synthetic insulating paper having a void ratio of 50% and a Garley air-permeability of 1,200 sec./100 cc. can be obtained. The synthetic insulating paper before extraction in benzene has a void ratio of 30% and a Garley air-permeability of 20,000 sec./100 cc.

CHARACTERISTICS AND UTILITIES

According to the present invention, there can be obtained an electrically insulating synthetic paper in which the matrix resin is uniformly dispersed in the fibrous substrate and uniform fine voids are dispersed uniformly.

By impregnating the electrically insulating synthetic paper of the present invention with any desired insulating fluid such as insulating oils, insulating gases and insulat-varnishes, there can be obtained an insulating material having a desirable combination of low dielectric loss and high dielectric strength. Moreover, this new insulating material has less tendency to have a decreased dielectric strength by an increase in thickness than the conventional insulating materials.

Examples of the insulating oil that can be used in the present invention include mineral oil-type OF cable oils, polybutene oils, naphthene-type mineral oils from which the aromatic components have been removed, alkylbenzene oils, and polysiloxane oils.

As the insulating fluid, liquefied gases such as liquid nitrogen, liquid hydrogen, and liquid helium, and other extremely low temperature insulating fluids, and any insulating gases such as sulfur hexafluoride can be used.

The plastic OF cable according to the present invention can be produced by lapping the snythetic insulating paper of the invention in multilayers onto a conductor having an oil path provided inside thereof to form an insulating layer, providing a sheath of aluminum or lead thereabout, and impregnating an insulating oil under high vacuum. Or it may be produced by lapping the synthetic insulating paper onto a conductor in multilayers, providing a shielding layer, associating a plurality of such synthetic insulating paper lapped conductor together with an oil path and a filler, providing a sheath of aluminum or lead, and impregnating an insulating oil into the cable.

Referring to FIG. 11, the single-core, hollow conductor-type OF cables will be described. The reference numeral 1 is an oil path formed by twisting a stainless steel code 1' in an open helical shape, and the reference numeral 2 is a conductor formed by twisting a plurality of metal wires on the outside of the oil path 1. On the outside of the conductor 2, an internal semiconducting layer 3 around which is wound a semi-conducting tape such as a semi-conducting kraft paper containing carbon, an insulating layer 4 on which a synthetic insulating paper impregnated with a compounded oil of the present is wound, and an outer semi-conducting layer 5 of substantially the same construction as the internal semiconducting layer 3 are provided in this order. Further on the outside, there are provided a shielding layer using a metal tape, and an outer metal sheath 7. On the outside of the metal shealth, an anti-corrosive layer of neoprene etc. for corrosive resistance of cables or a cable reinforcing layer of a steel belt or wire can also be provided.

The OF cables of the present invention will further be described with reference to the three-core shielding type cables illustrated in FIG. 12. In this figure, the reference numeral 11 is a conductor on the outside of which are provided an internal semiconducting layer 12, an insulating layer 13 consisting of the synthetic insulating paper of the invention impregnated with the insulating oil of the invention, an outer semiconducting layer 14 and a shielding layer 15, in the order mentioned.

The three shielded cores are twisted in a circular shape together with the oil path 10 and the filler 17, and outside threreof, an inner metal sheath 18 is provided. A reinforcing layer 19, an anticorrosive layer 20, and an outer metal-coated layer 21 are provided in sequence.

It goes without saying that the synthetic insulating paper of the invention can be utilized in the production of pipe-type cables.

According to the present invention, the synthetic insulating paper described is provided between electric conductors and then impregnated with varnish, thus using it as an insulating material. Any commercially available varnishes can be used. In particularly, varnishes of thermally stable synthetic resins such as unsaturated polyesters, epoxy resins, alkyd resins, silicone resins, polyimide resins, and polybenzimidazole resins, or varnishes consisting of asphalt and synthetic resins can be used for this purpose with good results.

The synthetic insulating paper of the present invention is superior in its capability to permit impregnation of the insulating varnishes and retain them, and has high air permeability. Hence, the electrically insulating material of the present invention has a desirable combination of low dielectric loss and high dielectric strength.

The conventional combinations of insulating paper and varnish used in electric appliances are poor in thermal stability and mechanical strength, and their electrical properties are not satisfactory. Furthermore, when known non-woven clothes or woven cloths are used as substrates for impregnation of the varnishes, there is the disadvantage that the obtained insulating material has low air-permeability and sufficient dielectric strength cannot be obtained. Increasing the thickness of the substrate for increasing the air-permeability results in a reduced tendency of the dielectric strength per unit insulating thickness.

The insulating materials of the present invention can be used in any desired form such as sheets, tapes and tubes as insulators in coils for various electrical appliances, inlet portions of cables, pipe-type cables, and other types of cables.

The following examples are given for further illustration of the invention.

EXAMPLE 1

A non-woven fabric made by the self-fusion method from polyester (polyethylene terephthalate) staple fibers of filament diameter about 15 microns is used as the base. The porosity of this non-woven fabric is 70% and its thickness under a pressure of 500 g./cm.$^2$ is 170 microns. This non-woven fabric is separately applied to a 10% solution of polycarbonate in N,N'-dimethylformamide and a 10% solution of polyethylene terephthalate in meta-cresol. The amount of resin applied is 15% based on the fabric. The polycarbonate solution is coagulated by means of water and thereafter the coating is water-washed. The polyethylene terephthalate solution is coagulated with methyl alcohol; following which ultrasonic washing of the fabric is carried out in water. The melting point of both polycarbonate and polyethylene terephthalate is in the neighborhood of 250° C., but since the polymer coagulated in the hereinabove described manner being amorphous the range of the melting point is not only broad but has been lowered, with the consequence that a hot calender finishing temperature in the range of 160–190° C. will suffice. An inter-roll pressure of 40 kg. is used at this time in carrying out the calendering treatment. The porosity of the resulting synthetic insulating paper is 45%. The insulating durability and dielectric properties of this synthetic insulating paper in its oil-impregnated state are shown in Table 1. The thickness of this insulating paper is 115 microns. The insulating oil used for impregnating the paper is dodecyl benzene oil.

TABLE 1

| Polymer applied | Properties at 80° C., 50 Hz., 1 kv./mm. | | Impulse breakdown voltage at 1 mm. thickness (negative polarity) (kv.) |
|---|---|---|---|
| | ε | Tan δ (percent) | |
| Polycarbonate | 2.54 | 0.054 | 145 |
| Polyethylene terephthalate | 2.70 | 0.068 | 139 |

These insulating papers are suitable for use with low-loss of OF cables.

EXAMPLE 2

The properties of synthetic insulating papers obtained by adding 10% of finely divided mica powder to each of the coating solutions of Example 1 are shown in Table 2.

TABLE 2

| Polymer applied | Properties at 80° C., 50 Hz., 1 kv./mm. | | Impulse breakdown voltage at 1 mm. thickness (negative polarity) (kv.) |
|---|---|---|---|
| | ε | Tan δ (percent) | |
| Polycarbonate | 2.58 | 0.057 | 158 |
| Polyethylene terephthalate | 2.74 | 0.068 | 152 | micron to the polyacrylonitrile solution of Example 4 is a heat-resistant material having a strong dielectric property of ε=50–100.

EXAMPLE 6

A non-woven web obtained from polyester staple fibers of filament diameter about 15 microns is used as the base. The porosity of this non-woven fabric is 70% and its thickness under a pressure of 500 g./cm.$^2$ is 170 microns. A 10% solution of polycarbonate in N,N'-dimethylformamide is applied to this non-woven fabric. The amount applied, based on the fabric, is 15%. One of the non-woven fabrics applied the polycarbonate solution is coagulated and washed with water, while the other is treated by the freeze-coagulation method and washed with water. Since the freezing temperature of a 10% solution of polycarbonate in N,N'-dimethylformamide is about −65° C., the fabric is frozen by dipping in liquid nitrogen for 30 seconds. These two sheets are then submitted to a hot calendering treatment under the conditions of a roll temperature of 170° C. and inter-roll compressive force of 2 kg./cm. The so obtained synthetic insulating paper is impregnated with dodecyl benzene oil, and the dielectric properties and dielectric strength are measured in this oil-impregnated state. The properties are shown in Table 3.

TABLE 3

| Sample | Thickness (μ) | Porosity (percent) | Dielectric properties at 80° C., 50 Hz., 5 kv/mm. | | Impulse breakdown voltage, 1 mm. thickness (negative polarity) (kv.) | |
|---|---|---|---|---|---|---|
| | | | ε | Tan δ (percent) | 10-piece average | Max-min., value spread |
| Synthetic insulating paper obtained by— | | | | | | |
| The freeze-coagulation method | 115 | 43 | 2.49 | 0.055 | 147 | 14 |
| The solvent-substitution method | 115 | 45 | 2.54 | 0.060 | 135 | 22 |

EXAMPLE 3

A non-woven fabric (thickness 170 microns) made from 4,6-nylon of filament diameter about 15 microns is applied a coating solution consisting of 15% of 4,6-nylon dissolved in methanol wherein calcium chloride has been dissolved. The amount of resin applied, based on the fabric, is 20%. Water is used as the coagulating solvent and wash liquid. Since the melting point of 4,6-nylon is about 300° C., calendering treatment conditions of temperature 230° C. and pressure 50 kg. are used in finishing the fabric. The so obtained synthetic insulting paper has a porosity of 50% and, in its oil-impregnated state, has an impulse breakdown voltage at 1 mm. thickness (negative polarity) of 150 kv. and ε of 3.45. This synthetic insulating paper excels in its heat resistance. The insulating oil used for impregnating the paper in this case was dodecyl benzene oil.

EXAMPLE 4

A non-woven fabric of 150-micron thickness obtained from polyacrylonitrile of filament diameter about 15 microns is applied a 10% solution of polyacrylonitrile in N,N'-dimethylformamide. The amount applied is 15%. The resulting insulating paper has a porosity of 40% and, in its oil-impregnated state, has an impulse breakdown voltage at 1 mm. thickness of 140 kv. and ε at 50 Hz. of 3.6. This product excels as a heat-resistant insulating paper. The insulating oil used in this case for impregnation of the paper was dodecyl benzene oil.

EXAMPLE 5

A synthetic insulating paper which is obtained by adding 10% of barium titanate of particle size less than one As is apparent from Table 3, the average value in respect of the dielectric strength is not only great but the range of dispersion is also small in the case of the synthetic insulating paper obtained by the freeze-coagulation method. Somewhat improved properties are also demonstrated with respect to the dielectric properties in the case of this insulating paper. This is believed to be due to the fact that the insulating paper obtained by the freeze-coagulation method is somewhat more crystalline than in the case of the paper obtained by the solvent-substitution method wherein the coagulated resin is in an amorphous state.

EXAMPLE 7

A 10% solution of polyethylene terephthalate in metacresol is applied under identical conditions as in Example 6. In one of the cases, the solvent-substitution method with methanol is carried out, followed by ultrasonic washing in water. In the other cases, a treatment is carried out by means of the freeze-coagulation method.

Since the freezing temperature of a 10% solution of polyester in metacresol is about 0° C., the freeze-coagulation is carried out by dipping the web in −30° C. methanol for 30 seconds. The washing is carried out as in the case with the solvent-substitution method.

The hot calendering treatment is then carried out at a roll temperature of 185° C. and an inter-roll pressure of 20 kg./cm.

Both synthetic insulating papers obtained have a thickness of 110 microns and a porosity of 43%. After impregnating these insulating papers with dodecyl benzene oil, their dielectric properties and dielectric strength were tested, with the results shown in Table 4.

TABLE 4

| Sample | Dielectric properties at 80° C., 50 Hz., 50 kv./mm. | | Impulse breakdown voltage at 1 mm. thickness (negative polarity) (kv.) | |
|---|---|---|---|---|
| | ε | Tan δ (percent) | 10-piece average | Max.-min. value spread |
| Synthetic insulating paper obtained by— | | | | |
| The freeze-coagulation method | 2.65 | 0.060 | 127 | 20 |
| The solvent-substitution method | 2.70 | 0.068 | 118 | 32 |

EXAMPLE 8

An 8% solution of polyethylene in xylol is applied to a non-woven fabric (thickness 180 microns) obtained from polyethylene of filament diameter about 10 microns. The amount of resin applied, based on the fabric, is 15%. This fabric is then frozen for 30 seconds in liquid nitrogen and thereafter dried in hot air of 130° C., followed by submission to a hot calendering treatment under the condition of a roll temperature of 80° C. and pressure of 20 kg./cm. The resulting synthetic insulating paper has a thickness of 125 microns and a porosity of 45%.

This synthetic insulating paper and a polyethylene film were tested for their dielectric properties and dielectric strength under the conditions of $SF_6$ 10 kg./cm.$^2$, with the results shown in Table 5.

TABLE 5

| Sample | Dielectric properties at 50° C., 50 Hz., 5 kv./mm. | | Impulse breakdown voltage at 1 mm. thickness (negative polarity) (kv.) |
|---|---|---|---|
| | ε | Tan δ (percent) | |
| Synthetic insulating paper of the present invention | 1.54 | 0.026 | 110 |
| Polyethylene film | 2.07 | 0.035 | 115 |

EXAMPLE 9

A 0.5% aqueous slurry of polyester fibers of filament length 3 mm. and 1.5 denier is made into a water-leaf of 65 grams per square meter thickness atop a moving wire gauge. This water-leaf is made into a synthetic insulating paper using an apparatus the arrangement of which is shown in FIG. 2.

The water-leaf 1 is conveyed to atop a screen belt 3 using a pair of belts 2. An N,N'-dimethylacetamide solution containing polycarbonate resin at a concentration of 10% is applied to the water-leaf by means of a spraying device 4. The amount of resin applied in this case is 40% based on the water-leaf. Next, the resinous solution-impregnated water-leaf is conveyed while being clapsed between the pair of screen belts 3,3' to between a fixed plate 5 and pressure rollers 6, where the water-leaf is intimately infused with the resinous solution. This is followed by conducting the resinous solution-impregnated water-leaf into a coagulating tank containing water while it is still being clasped between the pair of screen belts 3,3' to accomplish the coagulation of the resin on the water-leaf. Since the coagulated matrix resin-fiber sheet has a strength of at least 1 kg./cm., it is stripped from the screen belt 3 and conveyed externally of the coagulating tank along with the screen belt 3' and delivered to the washing step.

The washed sheet is dried and preheated at 160° C. and thereafter calendered at a temperature of 160–175° C. and a compressive force of 2.0 kg./cm.

The resulting synthetic insulating paper has a thickness of 100 microns, a porosity of 45% and a tensile strength of 7.0 kg./cm.

The electric properties such as dielectric strength and dielectric properties of this synthetic insulating paper in its state of impregnation with an alkylbenzene type of synthetic oil are shown in Table 6.

TABLE 6

Dielectric properties (80° C., 50 Hz.):
 ε _____ 2.73
 Tan δ (percent) _____ 0.054
Volume inherent resistivity (Ω·cm.) _____ $1 \times 10^{16}$
Dielectric strength (1 mm. thickness, oil pressure 2.0 kg./cm.$^2$):
 Impulse breakdown voltage (kv.) _____ 143
 AC short-period breakdown voltage (kv.) __ 57

Figure 2:
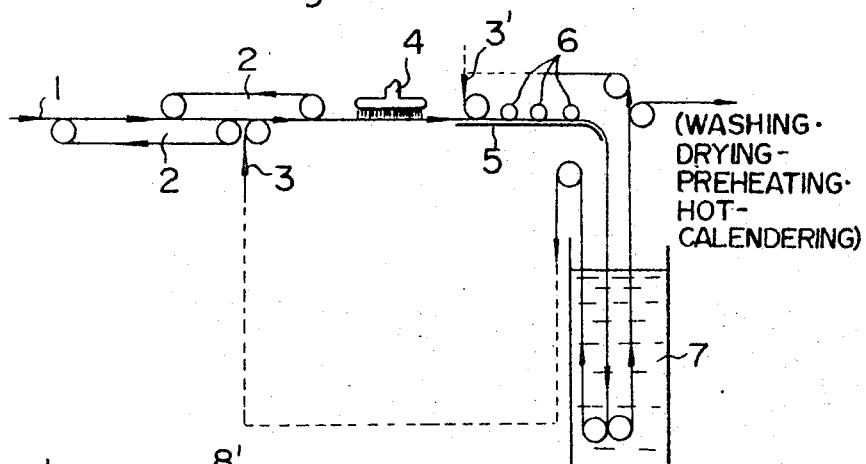
FIGS. 2 and 3 are schematic views illustrating another embodiment of the present invention in which an electrically insulating synthetic paper is produced using a fibrous web having no self-supporting properties.
Figure 3:
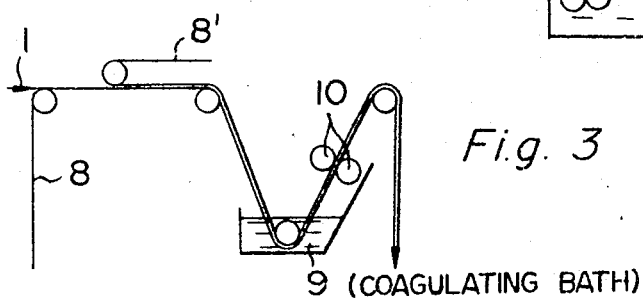

A similar synthetic insulating paper can also be obtained by a method which employs instead of the apparatus shown in FIG. 2 an apparatus partially shown in FIG. 3, wherein the water-leaf is clasped between a pair of screen belts 8,8', dipped in a solution of an organic, high molecular weight polymer contained in a tank 9 and thereafter wrung of its excess liquid by means of a pair of wringing rolls 10.

EXAMPLE 10

Polyester fibers of filament length 30 mm. and 1.5 denier are fed by means of an air stream to the surface of a porous endless belt, which travels over a suction box to make a dry fibrous web of 70 g./m.$^2$. This method of making a dry non-woven fabric is known as the Texpa process. The apparatus shown in FIG. 2 is used and a synthetic insulating paper is made from this fibrous web.

The fibrous web 1 is conveyed to atop the screen belt 3 using the pair of belts 2. An N,N'-dimethylacetamide solution containing a polycarbonate resin at 10% concentration is applied to the web, the application of the resin being in an amount of 40% based on the web. Next, the resinous solution-impregnated fibrous web, while being clasped between the pair of screen belts 3,3', is conveyed to between the fixed plate 5 and the pressure rollers 6 where the web is intimately infused with the resinous solution. This is followed by conducting the resinous solution-impregnated fibrous web, while still in its state of enclaspment between the pair of screen belts 3,3', into a coagulating tank containing pure water, whereat the resin is coagulated on the web. Since the coagulated matrix resin-fiber sheet has a strength of at least 1 kg./cm., it is stripped from the screen belt 3 and conveyed externally of the coagulating tank along with the screen belt 3' and delivered to the washing step.

The washed sheet is dried and preheated at 160° C. and thereafter calendered at a temperature of 160–175° C. and a compressive force of 1.5 kg./cm.

The synthetic insulating paper thus obtained has a thickness of 110 microns, a porosity of 50% and a tensile strength of 8.0 kg./cm.

The electric properties of this synthetic insulating paper, such as its dielectric strength and dielectric properties, in its state of impregnation with an alkylbenzene type synthetic oil are comparable to those values shown in Table 6, above. Its tensile strength is enhanced, however, and its resistance to flexing is improved remarkably, since in this case the fibers used are long.

A similar synthetic insulating paper is also obtained by a method which employs instead of the apparatus shown in FIG. 2 an apparatus partially shown in FIG. 3, wherein the fibrous web is clasped between the pair of screen belts 8,8', dipped in a solution of an organic, high molecular weight polymer contained in the tank 9 and thereafter wrung or its excess liquid by means of a pair of wringing rolls 10.

EXAMPLE 11

A synthetic insulating paper is made, using the apparatus of an arrangement illustrated in the accompanying FIG. 4.

A non-woven fabric (weight 75 g./m.$^2$) obtained by the self-fusion method from polyester (polyethylene terephthalate) fibers of filament diameter about 15 microns is used as the fibrous substrate. This non-woven fabric is dipped in a 10% solution of polycarbonate in dimethylacetamide, the amount of application (calculated as the solution) being so adjusted to become about 100 g./m.$^2$.

One of the samples is coagulated in pure water, followed by washing for about one hour in a stream of pure water. The other sample is dipped for one hour in pure water of a first coagulating tank to effect its preliminary coagulation and thereatfer dipped in pure water of a second coagulating tank where it is exposed in this state for 10 minutes to an ultrasonic vibration of about 30 kc., followed by water-washing for 25 minutes. Both samples are then dried and thereafter treated with hot calender rolls of surface temperature 190° C. and a contact point compressive pressure of 20 kg. The samples are then vacuum dried at 120° C. and impregnated with a dodecyl benzene type synthetic oil. The so obtained samples are tested for their impulse breakdown voltage when laminated to a thickness of one mm., their dielectric properties at a thickness of 0.4 mm., as well as apparent density and air permeability.

the amount of resin applied becomes 15% based on the fabric. This is then coagulated by means of solvent substitution with pure water, followed by washing in a stream of pure water. This is followed by drying and then calendering at a temperature of 160° C. and an inter-roll pressure of 5.0 kg./cm. The resulting synthetic insulating paper has a thickness of 115 microns, a porosity of 40% and a Garley air permeability of 2300 seconds. And, as its mechanical properties, it has a tensile strength of 10.6 kg./15 mm. width, modulus of elasticity of $1.1 \times 10^2$ kg./mm.$^2$ and a break elongation of 40%. Its dielectric properties in an oil-impregnated state and under conditions of 80° C., 50 Hz, 2.5 kv./mm. are $\epsilon=2.65$ and tan $\delta=0.054\%$.

Experiments are carried out to find the time required for the tan $\delta$ to become less than 0.035 at the various temperatures. The results: above 100 days at 80° C., 40 days at 100° C., 17 days at 120° C., 8 days at 140° C., 5 days at 160° C. and 3 days at 180° C.

The $T_g$ of the polycarbonate resin, the matrix resin, is 120–150° C. Hence, as is apparent from the foregoing results, a heat treatment at a temperature lower than 120° C. is problematical from the standpoint of practicality.

A synthetic insulating paper which has been submitted to a heat treatment of 140° C.×8 days shows practically no change in its properties such as thickness, porosity, and air permeability but, on the other hand, is seen to demonstrate a great improvement in its mechanical properties as well as dielectric properties. That is to say, of the mechanical properties, the tensile strength is 11.8 kg./15 mm. width, the modulus of elasticity is $1.8 \times 10^2$ kg./mm.$^2$ and the breakage elongation is 21%. On the other hand, the dielectric properties in an oil-impregnated state and under the conditions of 80° C., 50 Hz, 2.5 kv./mm. are $\epsilon=2.63$ and tan $\delta=0.030\%$.

TABLE 7

| Sample | Apparent density | Porosity (percent) | Air permeability (sec./100 cc. air) | Impulse breakdown voltage at 1 mm. thickness (kv.) | Dielectric properties at 80° C. $\epsilon$ | Tan $\delta$ (percent) |
|---|---|---|---|---|---|---|
| Not submitted to ultrasonic vibration | 0.78 | 41 | 750 | 120 | 2.78 | 0.068 |
| Submitted to ultrasonic vibration | 0.65 | 50 | 1,500 | 135 | 2.56 | 0.059 |

EXAMPLE 12

A metacresol coating solution which has in solution 10% of polyester is applied in an amount of 80 g./m.$^2$ to the polyester non-woven fabric of Example 11. After coagulation for one minute in methanol, one of the samples is washed in a stream of pure water for about 30 minutes and the other sample is washed for 10 minutes in a stream of pure water which has been applied an ultrasonic vibration of 30 kc., followed by further washing for 20 minutes. These samples are calendered under identical conditions as in Example I and submitted to the various tests, with the results shown in Table 8.

While the $T_m$ of polycarbonate, the matrix resin, is 220–230° C. according to literature, that of an amorphous polycarbonate, as in the case of the present invention declines and is on the order of 180–195° C.

As a result of this decline in the $T_m$, the matrix resin melts in the case of the synthetic insulating paper which has been submitted to a heat treatment of 180° C.×3 days and shrinkage takes place on account of the surface tension, although the mechanical properties and dielectric properties of this insulating paper are improved. Hence, a great decline takes place in the air permeability to result in a Garley air permeability of only 120 sec-

TABLE 8

| Sample | Apparent density | Porosity (percent) | Air permeability (sec./100 cc. air) | Impulse breakdown voltage at 1 mm. thickness (kv.) | Dielectric properties at 80° C. $\epsilon$ | Tan $\delta$ (percent) |
|---|---|---|---|---|---|---|
| Not submitted to vibration | 0.80 | 42 | 450 | 115 | 2.83 | 0.117 |
| Submitted to vibration | 0.72 | 48 | 1,300 | 130 | 2.69 | 0.082 |

EXAMPLE 13

A non-woven fabric of thickness 150 microns and porosity 70% obtained from polyester staples of filament diameter about 15 microns is applied a 10% solution of polycarbonate in N,N'-dimethylacetamide such that onds. This gives rise to trouble as to its dielectric strength, and hence it is not suitable as an insulating paper for ultrasuper high voltage use.

The $T_m$ of a matrix resin polycarbonate whose crystallinity has been raised by a suitable heat treatment becomes 220–230° C., and hence, generally speaking, the synthetic insulating paper which has received a heat treatment demonstrates an improvement in its heat resistance.

EXAMPLE 14

A 10% solution of polycarbonate in N,N'-dimethylformamide is applied to a non-woven fabric of 170-micron thickness and 70% porosity obtained from polyester fibers of filament diameter of about 15 microns, after which the solution applied is coagulated with pure water and the fabric is washed in a stream of pure water. This fabric, after drying, is submitted to a calendering treatment under varying conditions.

The synthetic insulating paper obtained by treatment at room temperature with chromium-plated steel rolls at a compressive force of 50 kg./cm. has a thickness of 110 microns, a Garley air permeability of 230 seconds and a porosity of 25%.

The fabric is calendered with chloroprene rolls whose roll surface temperature is 80° C. and at a compressive force of 10 kg./cm.$^2$. The modulus of elasticity of chloroprene at 80° C. is about $15 \times 10^2$ kg./cm.$^2$. The resulting product is suitable for use as an insulating paper, it having a thickness of 80 microns, a Garley air permeability of 3700 seconds and a porosity of 47%.

EXAMPLE 16

Synthetic insulating papers are obtained by carrying out the calendering treatments as in Examples 14 and 15, except that the porous fibrous substrate and the organic, high molecular weight polymer to be impregnated therein are varied and the treatment temperature and inter-roll compressive force are also varied. The properties of the so obtained synthetic insulating papers are measured, which results are shown in Table 9.

TABLE 9

| | | | Calendering conditions | | Properties of snythetic insulating paper | | | |
|---|---|---|---|---|---|---|---|---|
| Run | Fiber | Matrix resin | Temperature (° C.) | Type of rolls | Pressure (kg./cm.) | Garley air permeability (sec.) | Thickness ($\mu$) | Porosity (percent) |
| 1 | Polyamide | Polyamide | Room | Steel | 200 | 140 | 100 | 28 |
| 2 | do | do | Room | Cotton (ME* $5 \times 10^4$) | 120 | 2,800 | 110 | 47 |
| 3 | do | do | 120 | Hard silicon rubber (ME $1 \times 10^3$) | 80 | 6,800 | 110 | 46 |
| 5 | do | do | 120 | Asbestos (ME $1 \times 10^5$) | 80 | 380 | 105 | 36 |
| 4 | Polytetrafluoroethylene | Polycarbonate | Room | do | 180 | 1,500 | 110 | 45 |
| 6 | do | do | Room | Cotton | 150 | 3,100 | 110 | 47 |
| 7 | do | do | 80 | do | 100 | 3,700 | 115 | 52 |
| 8 | do | do | 150 | Steel | 200 | 150 | 95 | 21 |
| 9 | Polyacrylonitrile | Polyester | Room | Hard silicon rubber | 130 | 450 | 120 | 58 |
| 10 | do | do | 100 | do | 80 | 1,200 | 115 | 49 |
| 11 | do | do | 150 | do | 50 | 6,500 | 110 | 45 |
| 12 | do | do | 150 | Steel | 200 | 200 | 100 | 27 |
| 13 | Asbestos | Polyacrylonitrile | 120 | Asbestos | 180 | 2,300 | 100 | 34 |
| 14 | do | do | 120 | Hard silicon rubber | 50 | 5,300 | 115 | 55 |
| 15 | do | do | Room | Chloroprene (ME $3 \times 10^2$) | 80 | 780 | 120 | 62 |
| 16 | do | do | Room | High density polyethylene (ME $5 \times 10^3$) | 180 | 8,900 | 110 | 50 |

*ME represents modulus of elasticity (kg./cm.$^2$).

When the synthetic insulating paper is clapsed between polypropylene films of 150 micron thickness and having a modulus of elasticity of $1 \times 10^4$ kg./cm.$^2$ and treated at room temperature with the foregoing steel rolls at a compressive force of 30 kg./cm., the insulating paper obtained has a thickness of 115 microns, a Garley air permeability of 7500 seconds and a porosity of 34%, thus making it suitable for insulation purposes.

Next, the calendering is carried out at a temperature of 120° C., using as the elastic member a fluorine-containing rubbery sheet whose thickness is 0.5 mm. and modulus of elasticity at 120° C. is about $4 \times 10^2$ kg./cm.$^2$. An inter-roll compressive force of 20 kg./cm. is used. The resulting synthetic insulating paper has a thickness of 125 microns, a Garley air permeability of 3800 seconds and a porosity of 43%, thus having properties making it suitable for use as an insulating paper.

EXAMPLE 15

A xylol solution containing 7% of high pressure method polyethylene is applied to a non-woven fabric of 120 micron thickness and 70% porosity obtained from polypropylene fibers of filament diameter about 15 microns, after which the coagulation thereof is effected by rapid freezing in −30° C. methanol. The fabric is then removed of the xylol by treating in 130° C. hot air, following which it is calendered in the following manner.

The fabric is calendered with chromium-plated steel rolls of 80° C. roll surface temperature at a compressive force of 30 kg./cm. to obtain a synthetic insulating paper having a thickness of 60 microns, a Garley air permeability of 1200 seconds and a porosity of 8%, a product unsuitable for use as an insulating paper.

EXAMPLE 17

A 0.5% aqueous slurry of 1.5 denier polyester fibers of a filament length of 3 mm. are made on moving wire-gauze into a water-leaf having a thickness of 65 g./m.$^2$. This water-leaf is made into a synthetic insulating paper using the apparatus of the arrangement illustrated in FIG. 2.

The water-leaf 1 is conveyed onto the screen belt 3 using the belt 2. The water-leaf is applied by means of the spraying device 4 an N,N'-dimethylacetamide solution containing a polycarbonate resin at a concentration of 10%, the resin being applied in an amount of 40% based on the fiber. The water-leaf impregnated with the resinous solution is then conveyed while being clasped between the pair of screen belts 3,3', to between the fixed plate 5 and the pressure rolls 6, where the fibers are intimately infused with the resinous solution-impregnated water-leaf, while still being clasped between the pair of screen belts 3,3', is conducted into the coagulating tank which contains pure water, where the resin is coagulated on the fibers. Since the coagulated matrix resin-fiber sheet has a strength of at least 1 kg./1 cm., it is stripped from the screen belt 3 and conveyed externally of the coagulating tank along with the screen belt 3' and then delivered to the washing step.

The washed sheet, after having been dried and pre-heated at 16° C., is calendered at a temperature of 160–175° C. and a pressure of 2.0 kg./cm.

The so obtained synthetic insulating paper has a thickness of 100 microns, a porosity of 45% and a tensile strength of 7.0 kg./cm.

This insulating paper is wound in between the coils wound with wise of 1-mm. diameter and impregnated with a polyester resin varnish as the resin portion.

A varnish-impregnated piece of equipment obtained in this manner has the following proportion:

| | In the case where— | |
|---|---|---|
| | The invention insulting paper is used | Varnished paper is used |
| Resistance, MΩ | >1,000 | 500 |
| Breakdown voltage (kv./mm.) 24 hrs. in 100% RH | 35 | 30 |
| Decline in resistance after left standing, percent | <10 | 50 |
| Decline in withstand voltage after degradation by heating for 100 hrs. at 150° C., percent | 10 | 50 |

EXAMPLE 18

A non-woven fabric of 70% porosity and 170-micron thickness made from polyester fibers of filament diameter about 15 microns is dipped in a 10% solution of polycarbonate in dimethylacetamide. The ultrasonic oscillator provided in the polymeric solution tank is one having a number of vibration of 28 kHz. and an onpart of 1 watt/cm.$^2$. The distance λ 35 between the non-woven fabric and the face from which oscillations emanate is set at 13 mm. and the length of immersion of the non-woven fabric is 40 cm. The non-woven fabric in dipped in the polymeric solution under these conditions at a production rate of 3 meters/min. The amount of polymer impregnated in 25%.

The non-woven fabric impregnated with the polymeric solution, after being coagulated with pure water, is washed in a stream of pure water and dried. It is then calendered by means of cotton rolls of 80° C. and an inter-roll pressure of 100 kg./cm.

Thus is obtained a synthetic insulating paper of 110-micron thickness and 43% porosity.

By way of comparison, a synthetic insulating paper is obtained in similar manner except that it is not exposed to ultrasonic vibrations.

The so obtained synthetic insulating paper are impregnated with insulating oil and tested for their impulse breakdown voltage in a state wherein two sheets are laid one on top of the other. The results obtained are shown in Table 10.

TABLE 10

| | Impulse breakdown voltage | | |
|---|---|---|---|
| | Average value (kv./mm.) | Maximum value (kv./mm.) | Minimum value (kv./mm.) |
| Sample: | | | |
| Exposed | 163 | 172 | 145 |
| Unexposed | 153 | 166 | 121 |

EXAMPLE 19

Synthetic insulating papers are obtained by repeating Example 18, except that the production speed (dipping speed) of 10 meters per minute is used.

These samples are likewise tested for their impulse breakdown voltage, with the results shown in Table 11.

TABLE 11

| | Impulse breakdown voltage | | |
|---|---|---|---|
| | Average value (kv./mm.) | Maximum value (kv./mm.) | Minimum value (kv./mm.) |
| Sample: | | | |
| Exposed | 165 | 175 | 145 |
| Unexposed | 145 | 157 | 120 |

EXAMPLE 20

A synthetic insulating paper is prepared by operating or in Example 18, except that, instead of effecting the coagulation in water, the impregnated fabric is dipped for 5 seconds in liquid air to freeze the solution, after which the fabric is washed in water.

The impulse breakdown voltage of the so obtained synthetic insulating paper is as follows:

| | Kv./mm. |
|---|---|
| Average value | 164 |
| Maximum value | 173 |
| Minimum value | 146 |

EXAMPLE 21

A non-woven fabric (porosity 70%, thickness 170 microns) is applied and impregnated with a 10% (wt.) solution of polycarbonate in dimethylformamide. The amount of the polycarbonate resin impregnated is 23% based on the weight of the fabric. The resinous solution-impregnated non-woven fabric is then dipped in a coagulating tank containing water to coagulate and deposit the polycarbonate on the fabric, followed by thorough washing in running water. The so-obtained resin-containing fabric is divided into two. One of the fabrics is calendered while still in its wet state (designated sample A), while the other is thoroughly dried in hot air of 100° C. (moisture content 0.5%), and thereafter calendered (designated sample B). Thus are obtained two samples of synthetic insulating papers.

In this case the same calendering conditions are used. Room temperature is used as the treatment temperature, and the calender rolls consisting of a combination of a cotton roll and a steel roll is employed with a compressive force of 130 kg./cm. between the rolls. The synthetic insulating papers A and B obtained in this manner have the properties shown in Table 12.

TABLE 12

| | Thickness (μ) | Apparent density (g./cm.$^3$) | Garley air permeability (sec./100 cc. air) |
|---|---|---|---|
| Sample: | | | |
| A | 112 | 0.75 | 2,500 |
| B | 110 | 0.76 | 2,800 |

The foregoing synthetic insulating papers are each slit into strips of 25-mm. width, and then an insulating layer is made up in each case by winding the strip around a copper tube of 20-mm. outside diameter with the edges of the strip abutting, the second layer being wound so as to overlap the strip of the first layer for a third of the width of the strip and a third layer being would in similar manner so as to overlap the strip of the second layer for a third of the width of the strip. An external electrode is formed on this insulating layer in customary manner, using tin foil of 15-micron thickness, after which a further reinforcing layer is formed with the synthetic resin paper. After this is vacuum dried at 120° C., it is impregnated with deaerated oil at normal atmospheric pressure. The so prepared sample is used for measuring the corona discharge starting voltage. By way of reference, measurements are carried out on samples in which the oil pressure used is normal atmospheric pressure plus 1 kg./cm.$^2$. These samples are set in the corona measurement apparatus in customary manner and measured for their corona discharge starting voltage. The results obtained are shown in Table 13.

TABLE 13

| Run | Sample A Atmospheric pressure | Sample A Atmospheric pressure plus 1 kg./cm.² | Sample B Atmospheric pressure | Sample B Atmospheric pressure plus 1 kg./cm.² | Remarks |
|---|---|---|---|---|---|
| 1 | 18.6 | 19.2 | 17.4 | 18.9 | |
| 2 | 18.9 | 19.4 | 18.1 | 19.0 | |
| 3 | 18.5 | 19.0 | 18.3 | 18.7 | |
| 4 | 19.2 | 19.4 | 12.0 | 12.3 | Abnormal sample. |
| 5 | 18.5 | 19.1 | 18.4 | 19.0 | |
| 6 | 18.7 | 19.0 | 17.6 | 18.3 | |
| 7 | 19.3 | 19.4 | 12.5 | 12.6 | Do. |
| 8 | 18.9 | 19.8 | 18.8 | 19.1 | |
| 9 | 19.0 | 19.5 | 17.4 | 18.4 | |
| 10 | 18.6 | 19.7 | 17.9 | 18.3 | |

We claim:

1. An electrically insulating material comprising a synthetic insulating paper and an insulating fluid impregnated in said synthetic paper, said insulating fluid being selected from insulating oils, insulating gases or insulating varnishes; said insulating paper comprising a porous, fibrous substrate and 5 to 70% by weight, based on the substrate, of a high molecular weight organic matrix polymer distributed uniformly and three-dimensionally in the substrate, wherein:
   (1) said substrate is a fibrous web consisting of a nonwoven cloth of staple fibers or filaments selected from glass fibers, rock wool, asbestos fibers, polyester fibers, polyolefin fibers, polyacrylonitrile fibers, polyamide fibers, polycarbonate fibers, polyphenylene oxide fibers, polysulfone fibers or polyfluoroethylene fibers;
   (2) said high molecular weight organic matrix polymer is a film-forming polycarbonate, polyphenylene oxide, polysulfone, polyester, polyamide or polyolefin resin;
   (3) said paper has numerous fine voids;
   (4) the voids are in the flattened state as a result of mechanical collapsing and the adjoining voids are connected to one another, and
   (5) said paper has a void ratio of 10 to 70%, said void ratio being substantially constant along the entire cross-section of the paper in its thickness direction.

References Cited

UNITED STATES PATENTS

| | | | |
|---|---|---|---|
| 3,044,895 | 7/1962 | Isaacson | 117—60 |
| 3,142,609 | 7/1964 | Deretchin et al. | 117—60 |
| 3,268,354 | 8/1966 | Hain | 117—60 |
| 3,424,604 | 1/1969 | Fuitushima et al. | 117—65.2 |
| 3,100,721 | 8/1963 | Holden | 117—63 |
| 3,238,055 | 3/1966 | Brightwell | 117—65.2 |
| 3,546,001 | 12/1970 | Giannone et al. | 117—65.2 |
| 3,520,767 | 7/1970 | Manwaring | 117—65.2 |
| 3,524,755 | 8/1970 | Hochberg | 117—63 |
| 3,461,219 | 8/1969 | Endacott et al. | 117—65.2 |
| 3,645,776 | 2/1972 | Makajo et al. | 117—65.2 |

WILLIAM D. MARTIN, Primary Examiner

M. SOFOCLEOUS, Assistant Examiner

U.S. Cl. X.R.

117—63, 65.2, 126 G, B, 138.8 A, E, F, N, UF, 140 A